United States Patent
Dorrian et al.

(10) Patent No.: US 11,313,511 B2
(45) Date of Patent: Apr. 26, 2022

(54) ANTI-LIGATURE ENCLOSURE FOR WALL-MOUNTED APPARATUS

(71) Applicants: Michael F. Dorrian, Jefferson Hills, PA (US); Anthony J. Vignere, Harmony, PA (US)

(72) Inventors: Michael F. Dorrian, Jefferson Hills, PA (US); Anthony J. Vignere, Harmony, PA (US)

(*) Notice: Subject to any disclaimer, the term of this patent is extended or adjusted under 35 U.S.C. 154(b) by 0 days.

(21) Appl. No.: 16/507,496

(22) Filed: Jul. 10, 2019

(65) Prior Publication Data

US 2020/0025331 A1 Jan. 23, 2020

Related U.S. Application Data

(60) Provisional application No. 62/699,967, filed on Jul. 18, 2018.

(51) Int. Cl.
| | |
|---|---|
| *F16M 11/00* | (2006.01) |
| *F16M 13/02* | (2006.01) |
| *F16B 41/00* | (2006.01) |

(52) U.S. Cl.
CPC .......... *F16M 13/02* (2013.01); *F16B 41/005* (2013.01)

(58) Field of Classification Search
CPC ............... F16M 13/00; F16M 2200/00; B60R 11/0241; H04M 1/04; H05K 9/0007; H01Q 1/22
See application file for complete search history.

(56) References Cited

U.S. PATENT DOCUMENTS

| 2,160,762 | A | * | 5/1939 | Stenberg | B60K 37/00 |
| | | | | | 52/208 |
| 4,895,326 | A | * | 1/1990 | Nimpoeno | B60K 37/04 |
| | | | | | 248/27.1 |
| 9,038,977 | B2 | * | 5/2015 | Nemoto | B60R 11/0241 |
| | | | | | 248/316.4 |
| 9,083,077 | B2 | * | 7/2015 | Yagyu | B60R 25/2063 |
| 9,456,531 | B2 | * | 9/2016 | Snider | B29C 59/16 |
| 2005/0001105 | A1 | * | 1/2005 | Matsuda | B60K 37/06 |
| | | | | | 248/27.1 |

* cited by examiner

*Primary Examiner* — Amy J. Sterling
(74) *Attorney, Agent, or Firm* — The Webb Law Firm

(57) ABSTRACT

Described is an anti-ligature enclosure for a wall-mounted apparatus. The enclosure includes a mounting box configured to be installed at least partially on a surface of a wall and at least partially within a space behind the wall. The mounting box includes a planar frame configured to be fastened to the surface of the wall and a recessed portion extending through the surface of the wall. The enclosure includes a mounting plate configured to contact and support the wall-mounted apparatus in an outward-facing position in the mounting box. The enclosure includes a cover plate configured to be securely fastened to at least part of an outer surface of the planar frame of the mounting box with one or more cover plate fasteners. The cover plate extends over and covers the wall-mounted apparatus and the mounting plate. An outer surface of the enclosure is flush-mounted to the surface of the wall.

20 Claims, 7 Drawing Sheets

ANTI-LIGATURE ENCLOSURE FOR WALL-MOUNTED APPARATUS

CROSS-REFERENCE TO RELATED APPLICATIONS

The present application claims priority to U.S. Provisional Patent Application No. 62/699,967, filed Jul. 18, 2018, entitled "Anti-Ligature Enclosure for Wall-Mounted Electronic Device," the disclosure of which is hereby incorporated by reference in its entirety.

BACKGROUND OF THE INVENTION

Field of the Invention

Disclosed embodiments relate generally to anti-ligature devices and encasements, and in some non-limiting embodiments or aspects, to an anti-ligature enclosure for a wall-mounted apparatus, e.g., a wall-mounted electronic device.

Technical Considerations

"Anti-ligature" is a term referring to the design of an object to be resistant or practically impervious to being a fastening point for cords, ropes, and rope-like objects (e.g., bed sheets, neckties, belts, string, wires, etc.). The anti-ligature design objective is of particular importance to the construction/configuration of environments for individuals who have the potential to self-harm, such as patients with mental illness, prison inmates, and the like. For example, a flat-screen television that is traditionally mounted to a wall by a bracket may need to be reconfigured with a shroud to prevent access to tie-off points. In another example, a door handle may need to be sloped and rounded such that tied objects slide off the handle when pressure is applied. Anti-ligature design is frequently taken into account for wall-mounted electronics, door and cabinet hardware, furniture, and light fixtures. For wall-mounted electronics, it may also be required to make the anti-ligature electronics resistant to tampering and able to be securely anchored, so that individuals do not remove them from the walls or expose the electrical wiring powering the electronics.

One example type of electronic that is frequently employed in hospital and prison environments is the wireless communication device, such as a proximity reader for cards, chips, circuits, computing devices, and the like. In the example of radio frequency identification (RFID) proximity card readers, personnel are able to gain access to different rooms and/or corridors by verifying their authorization using an identification card (e.g., an RFID-chipped card) that is carried on their person. Typically, such a wireless communication device is mounted on the face of a wall, and the wiring that powers and provides network connection to the wireless communication device is connected through an opening in the wall behind the mounted device. Even if a wall-mounted electronic device is itself designed to be resistant to tying, it is difficult to design the device to also be resistant to tampering and vandalism without significantly increasing the cost, size, and/or weight of the device itself. Increasing the bulk of hardware that is mounted on the surface of a wall is not desirable, as it effectively decreases the free range of movement in that space, and it increases the likelihood of the device being struck by moving equipment (e.g., a gurney).

SUMMARY OF THE INVENTION

In view of the foregoing, there is a need in the art for an anti-ligature enclosure for use with wall-mounted apparatus, e.g., wall-mounted electronic devices, to prevent tampering and tying-off by individuals in the apparatus's environment, and which also reduces the physical profile of the apparatus's mounting.

According to one non-limiting embodiments or aspect, provided is an anti-ligature enclosure for a wall-mounted apparatus. The anti-ligature enclosure includes a mounting box configured to be installed at least partially on a surface of a wall and at least partially within a space behind the surface of the wall. The mounting box includes a planar frame configured to be fastened to the surface of the wall and a recessed portion extending through the surface of the wall. The anti-ligature enclosure includes a mounting plate configured to contact and support the wall-mounted apparatus in an outward-facing position in the mounting box. The anti-ligature enclosure includes a cover plate configured to be securely fastened to at least part of an outer surface of the planar frame of the mounting box with one or more cover plate fasteners. The cover plate extends over and covers the wall-mounted apparatus and the mounting plate. An outer surface of the anti-ligature enclosure is flush-mounted to the surface of the wall.

In further non-limiting embodiments or aspects, the wall-mounted apparatus may be a wall-mounted electronic device. The recessed portion of the mounting box may be configured to at least partially contain wiring in the space behind the surface of the wall and include at least one opening to permit the wiring to extend outside the recessed portion of the mounting box and to connect to external wiring connections behind the surface of the wall. The mounting plate may include an aperture configured to permit the wiring to extend from the wall-mounted electronic device into the recessed portion of the mounting box. The mounting plate may be positioned to visually hide the wiring extending behind the wall-mounted electronic device and into the mounting box.

In further non-limiting embodiments or aspects, a transition from a perimeter edge of the cover plate to the planar frame may be configured to prevent an object from being tied to the edges of the planar frame.

In further non-limiting embodiments or aspects, the cover plate, while fastened to the planar frame of the mounting box, may cover wall fasteners for securing the planar frame to the surface of the wall, such that the wall fasteners cannot be accessed while the cover plate is secured.

In further non-limiting embodiments or aspects, the cover plate may be configured to permit a wireless communication device as the wall-mounted apparatus to transmit and receive signals through the cover plate. The cover plate may be manufactured from a material resistant to damaging contact acting upon the cover plate.

In further non-limiting embodiments or aspects, the cover plate may further include one or more countersunk fastener channels for the one or more cover plate fasteners, such that the one or more cover plate fasteners do not extend beyond an outer surface of the cover plate while the cover plate is secured to the planar frame. The one or more cover plate fasteners may include a plurality of two-hole screws.

In further non-limiting embodiments or aspects, the mounting plate may include a U-shaped cradle having a middle recess between two protrusions, formed to support and securely hold the wall-mounted apparatus in a recess between the protrusions. The mounting plate may be fastened to an inner ledge of the recessed portion of the mounting box and may be configured to cover an entire cross-sectional area of the recessed portion of the mounting box.

In further non-limiting embodiments or aspects, the recessed portion of the mounting box may include at least one opening to permit the wiring to extend outside the recessed portion of the mounting box and to connect to external wiring connections behind the surface of the wall.

In further non-limiting embodiments or aspects, the cover plate may be a transparent cover plate. The cover plate fasteners may also be tamper-resistant fasteners. The mounting plate may include an L-shaped cradle having a side recess adjacent a protrusion formed to support and securely hold the wall-mounted apparatus in the recess adjacent the protrusion.

According to one non-limiting embodiment or aspect, provided is a method of installing an anti-ligature enclosure. The method includes cutting a hole in a wall to receive a recessed portion of a mounting box of the anti-ligature enclosure. The method also includes inserting the recessed portion of the mounting box into the hole in the wall. The method further includes securing a planar frame of the mounting box to a surface of the wall with wall fasteners. The method further includes affixing a mounting plate to an interior of the mounting box, the mounting plate configured to contact and support a wall-mounted apparatus. The method further includes securing a cover plate to the planar frame of the mounting box with one or more cover plate fasteners, the cover plate extending over and covering the mounting plate such that an outer surface of the anti-ligature enclosure is flush-mounted to the surface of the wall.

In further non-limiting embodiments or aspects, the wall-mounted apparatus may be a wall-mounted electronic device. The method may further include connecting the wall-mounted electronic device to external wiring connections behind the surface of the wall via wiring through an aperture in the mounting plate, through an interior of the recessed portion of the mounting box, and through an opening in the recessed portion.

In further non-limiting embodiments or aspects, affixing the mounting plate to an interior of the mounting box may include fastening the mounting plate to an inner ledge of the recessed portion of the mounting box. The mounting plate may be configured to cover an entire cross-sectional area of the recessed portion of the mounting box.

In further non-limiting embodiments or aspects, securing the planar frame of the mounting box to the surface of the wall may precede securing the cover plate to the planar frame of the mounting box. The cover plate may cover the wall fasteners such that the wall fasteners cannot be accessed while the cover plate is secured.

In further non-limiting embodiments or aspects, a cross section of the hole in the wall may be greater than a cross-sectional area of the recessed portion of the mounting box and less than a cross-sectional area of the planar frame.

In further non-limiting embodiments or aspects, securing the cover plate to the planar frame of the mounting box with one or more cover plate fasteners may include fastening a plurality of two-hole screws through countersunk fastener channels in the cover plate and into fastener channels in the planar frame. A transition from a perimeter edge of the cover plate to the planar frame may be configured to prevent an object from being tied to the edges of the planar frame.

Other non-limiting embodiments or aspects of the present disclosure will be set forth in the following numbered clauses:

Clause 1: An anti-ligature enclosure for a wall-mounted apparatus, comprising: a mounting box configured to be installed at least partially on a surface of a wall and at least partially within a space behind the surface of the wall, the mounting box comprising a planar frame configured to be fastened to the surface of the wall and a recessed portion extending through the surface of the wall; a mounting plate configured to contact and support the wall-mounted apparatus in an outward-facing position in the mounting box; and a cover plate configured to be securely fastened to at least part of an outer surface of the planar frame of the mounting box with one or more cover plate fasteners, the cover plate extending over and covering the wall-mounted apparatus and the mounting plate, wherein an outer surface of the anti-ligature enclosure is flush-mounted to the surface of the wall.

Clause 2: The anti-ligature enclosure of clause 1, wherein: the wall-mounted apparatus is a wall-mounted electronic device; the recessed portion of the mounting box is configured to at least partially contain wiring in the space behind the surface of the wall and comprises at least one opening to permit the wiring to extend outside the recessed portion of the mounting box and to connect to external wiring connections behind the surface of the wall; the mounting plate comprises an aperture configured to permit the wiring to extend from the wall-mounted electronic device into the recessed portion of the mounting box; and the mounting plate is positioned to visually hide the wiring extending behind the wall-mounted electronic device and into the mounting box.

Clause 3: The anti-ligature enclosure of clause 1 or 2, wherein a transition from a perimeter edge of the cover plate to the planar frame is configured to prevent an object from being tied to the edges of the planar frame.

Clause 4: The anti-ligature enclosure of any of clauses 1-3, wherein the cover plate, while fastened to the planar frame of the mounting box, covers wall fasteners for securing the planar frame to the surface of the wall, such that the wall fasteners cannot be accessed while the cover plate is secured.

Clause 5: The anti-ligature enclosure of any of clauses 1-4, wherein the cover plate is configured to permit a wireless communication device as the wall-mounted apparatus to transmit and receive signals through the cover plate.

Clause 6: The anti-ligature enclosure of any of clauses 1-5, wherein the cover plate is manufactured from a material resistant to damaging contact acting upon the cover plate.

Clause 7: The anti-ligature enclosure of any of clauses 1-6, wherein the cover plate further comprises one or more countersunk fastener channels for the one or more cover plate fasteners, such that the one or more cover plate fasteners do not extend beyond an outer surface of the cover plate while the cover plate is secured to the planar frame.

Clause 8: The anti-ligature enclosure of any of clauses 1-7, wherein the one or more cover plate fasteners comprise a plurality of two-hole screws.

Clause 9: The anti-ligature enclosure of any of clauses 1-8, wherein the mounting plate comprises a U-shaped cradle having a middle recess between two protrusions, formed to support and securely hold the wall-mounted apparatus in a recess between the protrusions.

Clause 10: The anti-ligature enclosure of any of clauses 1-9, wherein the mounting plate is fastened to an inner ledge of the recessed portion of the mounting box and is configured to cover an entire cross-sectional area of the recessed portion of the mounting box.

Clause 11: The anti-ligature enclosure of any of clauses 1-10, wherein the cover plate is a transparent cover plate.

Clause 12: The anti-ligature enclosure of any of clauses 1-11, wherein the cover plate fasteners are tamper-resistant fasteners.

Clause 13: The anti-ligature enclosure of any of clauses 1-12, wherein the mounting plate comprises an L-shaped cradle having a side recess adjacent a protrusion formed to support and securely hold the wall-mounted apparatus in the recess adjacent the protrusion.

Clause 14: A method of installing an anti-ligature enclosure, comprising: cutting a hole in a wall to receive a recessed portion of a mounting box of the anti-ligature enclosure; inserting the recessed portion of the mounting box into the hole in the wall; securing a planar frame of the mounting box to a surface of the wall with wall fasteners; affixing a mounting plate to an interior of the mounting box, the mounting plate configured to contact and support a wall-mounted apparatus; securing a cover plate to the planar frame of the mounting box with one or more cover plate fasteners, the cover plate extending over and covering the mounting plate such that an outer surface of the anti-ligature enclosure is flush-mounted to the surface of the wall.

Clause 15: The method of clause 14, wherein the wall-mounted apparatus is a wall-mounted electronic device, the method further comprising connecting the wall-mounted electronic device to external wiring connections behind the surface of the wall via wiring through an aperture in the mounting plate, through an interior of the recessed portion of the mounting box, and through an opening in the recessed portion.

Clause 16: The method of clause 14 or 15, wherein affixing the mounting plate to an interior of the mounting box comprises fastening the mounting plate to an inner ledge of the recessed portion of the mounting box, the mounting plate being configured to cover an entire cross-sectional area of the recessed portion of the mounting box.

Clause 17: The method of any of clauses 14-16, wherein securing the planar frame of the mounting box to the surface of the wall precedes securing the cover plate to the planar frame of the mounting box, and wherein the cover plate covers the wall fasteners such that the wall fasteners cannot be accessed while the cover plate is secured.

Clause 18: The method of any of clauses 14-17, wherein a cross section of the hole in the wall is greater than a cross-sectional area of the recessed portion of the mounting box and less than a cross-sectional area of the planar frame.

Clause 19: The method of any of clauses 14-18, wherein securing the cover plate to the planar frame of the mounting box with one or more cover plate fasteners comprises fastening a plurality of two-hole screws through countersunk fastener channels in the cover plate and into fastener channels in the planar frame.

Clause 20: The method of any of clauses 14-19, wherein a transition from a perimeter edge of the cover plate to the planar frame is configured to prevent an object from being tied to the edges of the planar frame.

These and other features and characteristics of the present invention, as well as the methods of operation and functions of the related elements of structures and the combination of parts and economies of manufacture, will become more apparent upon consideration of the following description, and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular forms of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying figures, in which.

DETAILED DESCRIPTION OF THE INVENTION

Figure 1:
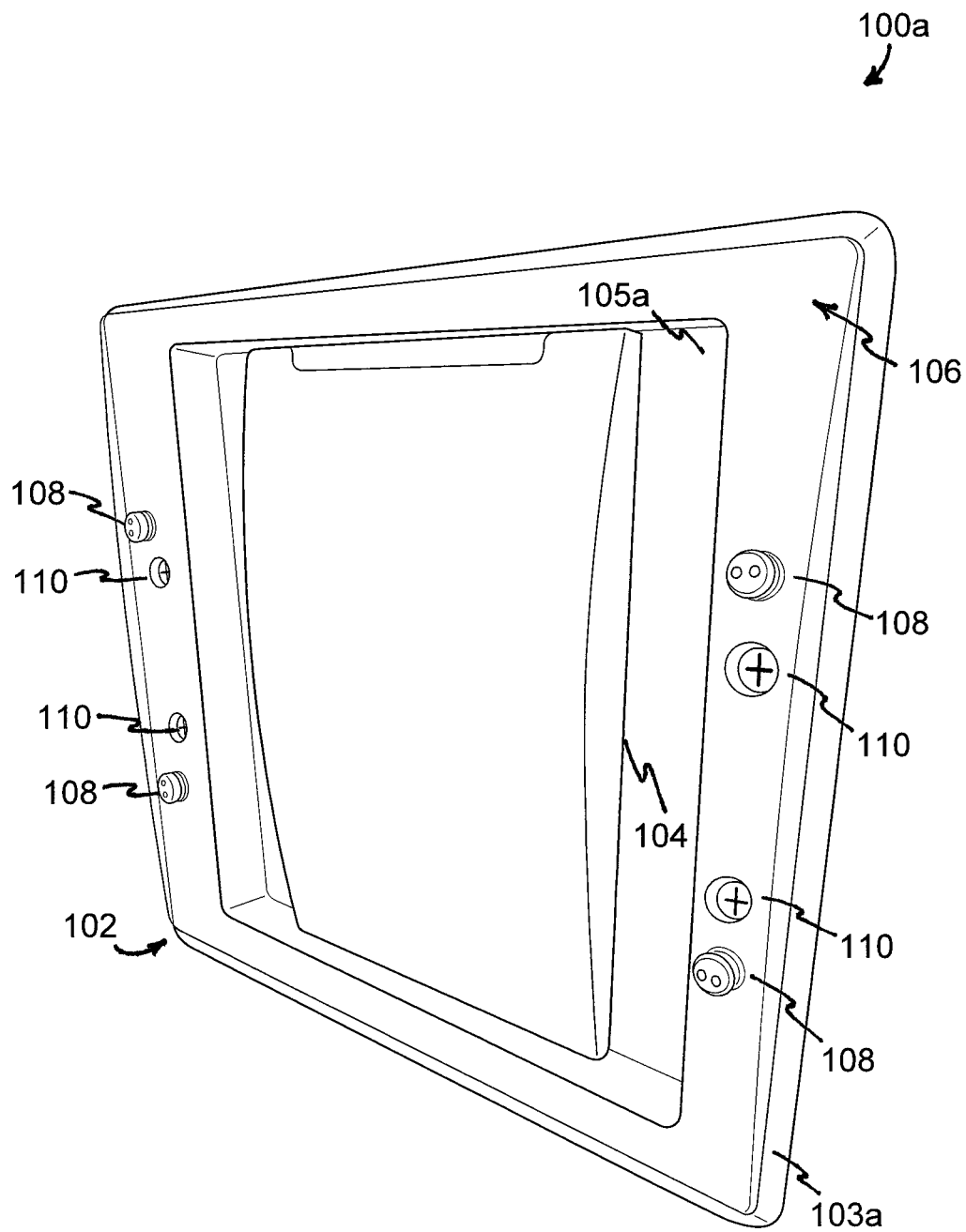
FIG. 1 is a perspective view of an anti-ligature enclosure for an exemplary wall-mounted apparatus.

For purposes of the description hereinafter, the terms "upper," "lower," "right," "left," "vertical," "horizontal," "top," "bottom," "lateral," "longitudinal," and derivatives thereof shall relate to the invention as the invention is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Also, it should be understood that any numerical range recited herein is intended to include all sub-ranges subsumed therein. For example, a range of 1 to 10 is intended to include all sub-ranges between (and including) the recited minimum value of 1 and the recited maximum value of 10, that is, having a minimum value equal to or greater than 1 and a maximum value of equal to or less than 10.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and the like), a personal digital assistant (PDA), and/or other like devices.

As used herein, the term "wireless communication device" (a type of electronic device) may refer to any transmitter, receiver, and/or transceiver that is capable of wirelessly transmitting signals to and/or receiving signals from a personal communication and/or identification device (e.g., card, chip, circuit, mobile device, and the like). For example, a wireless communication device may include a radio frequency identification (RFID) based proximity card reader. By way of another example, a wireless communication device may include a router for a local wireless computing network that is accessible by one or more mobile devices.

As used herein, the terms "tamper-resistant," "tamper-proof," "vandalism-resistant," and "vandalism-proof," will be understood to generally refer to materials that are configured to be at least partially (up to totally) impervious to damaging contact, such as scratching, abrading, blunt force, slashing force, piercing force, concussive force, sources of hot or cold, sources of liquid, and the like.

As used herein, the term "wall-mounted apparatus" may refer to any device or object configured to be attached to a wall. Wall-mounted apparatus may include wall-mounted electronic devices, which may include wireless communication devices. Disclosed anti-ligature enclosures may be employed to mount and protect various wall-mounted apparatus.

As used herein, the term "flush-mounted" may refer to an object that has a partially curved, sloped, or gradually diminishing border, to smoothly transition the face of the object to the mounting surface (e.g., a wall). "Flush-mounted" will also be understood to refer to a type of anti-ligature installation where the outer surface of the object projects an insufficient distance from the mounting surface for ligatures (e.g., rope), so as to prevent a knot or loop from being formed around the object or its parts, and so as to prevent the object from acting as a stability/anchor point for ligatures.

In non-limiting embodiments or aspects of the present invention, provided is an anti-ligature enclosure to provide anti-ligature and tamper-resistant features to electronics that otherwise lack those features. Solutions described herein allow electronics to be mounted on and within a wall without creating an obtrusive profile on the wall. Described anti-ligature enclosures include mounting boxes to provide for cable management and isolation of the specific components for a wall-mounted apparatus (e.g., an electronic device, a wireless communication device, a control panel, a screen, a computing device, etc.), and to provide an anchor point for securing the anti-ligature enclosure to the wall. A mounting plate provides for the wall-mounted apparatus to be supported and oriented outward-facing for proper operation, as well as to hide wiring and connections in the recess of the mounting box. A cover plate with fasteners (e.g., tamper-resistant fasteners) seals off the apparatus from being touched or tampered with, and the resulting outward profile of the anti-ligature enclosure is a relatively flat, smooth surface. In such a configuration, prefabricated electronics, particularly wall-mounted electronic devices, can be installed and made to be anti-ligature and tamper-resistant without modifying the wall-mounted electronic device itself.

Figure 2:
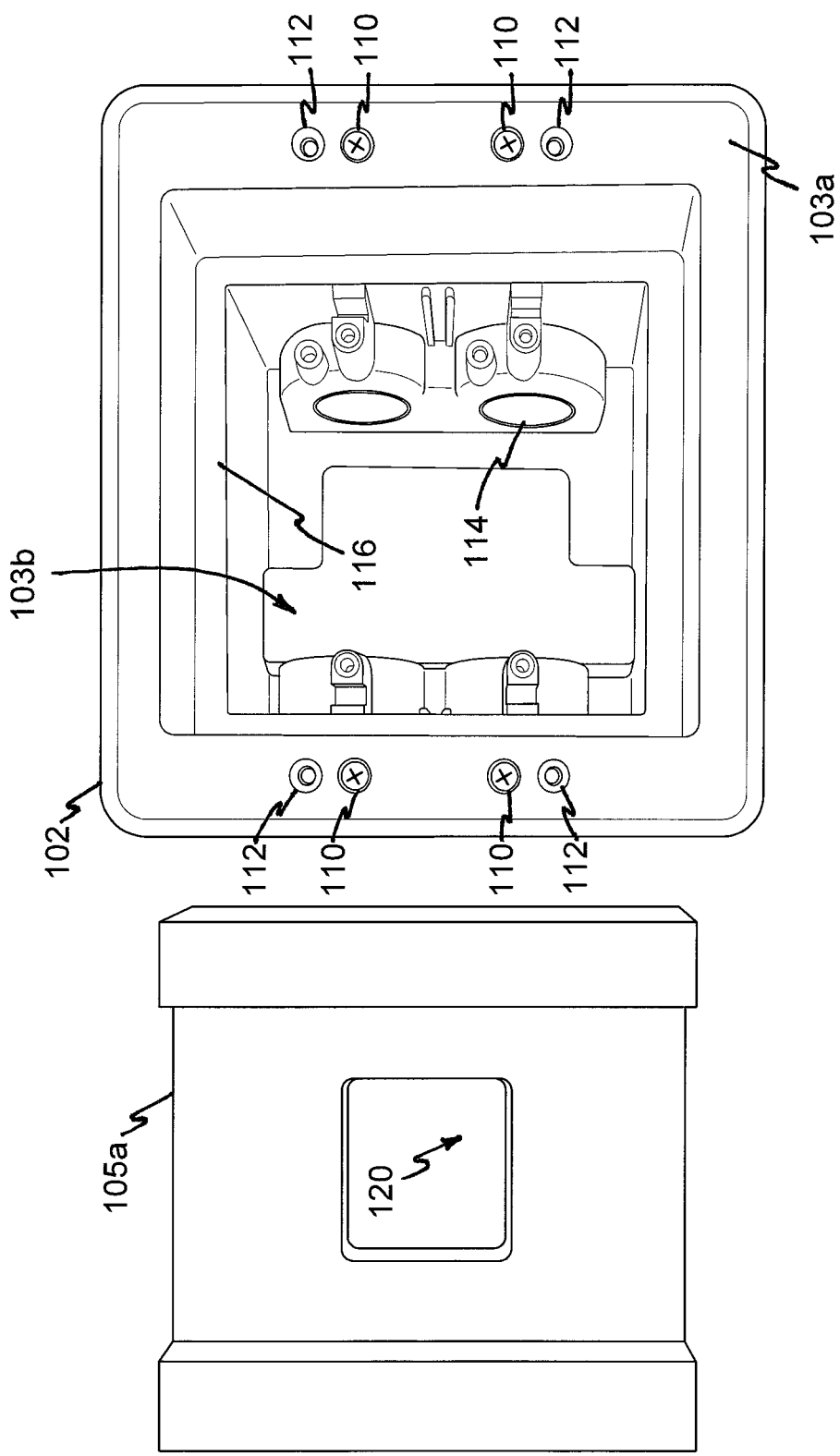
FIG. 2A is a front view of a mounting plate of the anti-ligature enclosure for the wall-mounted apparatus of FIG. 1.
FIG. 2B is a front view of a mounting box of the anti-ligature enclosure for the wall-mounted apparatus of FIG. 1.
Figure 3:
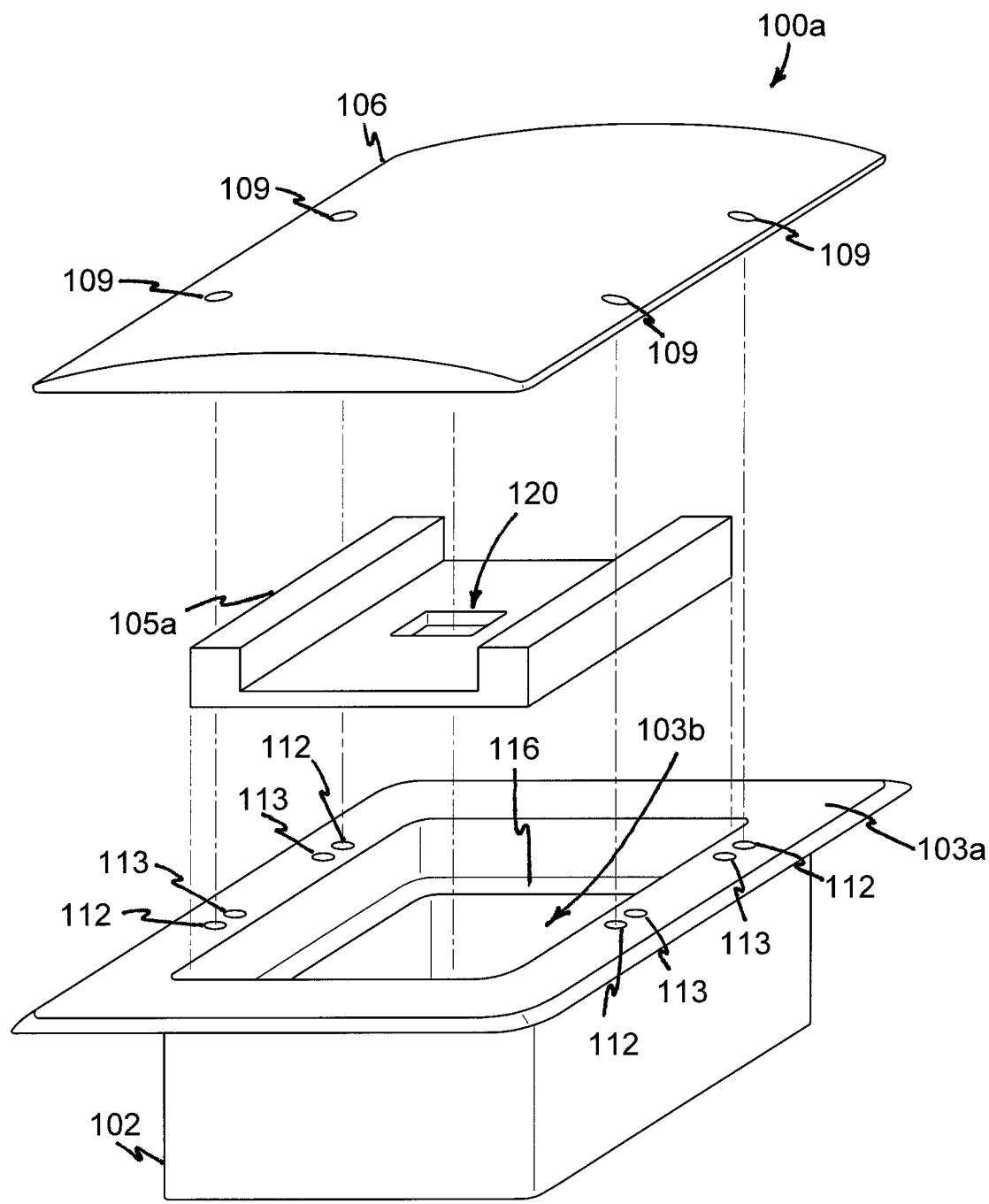
FIG. 3 is an exploded, perspective view of the anti-ligature enclosure for the wall-mounted apparatus of FIG. 1.
Figure 4:
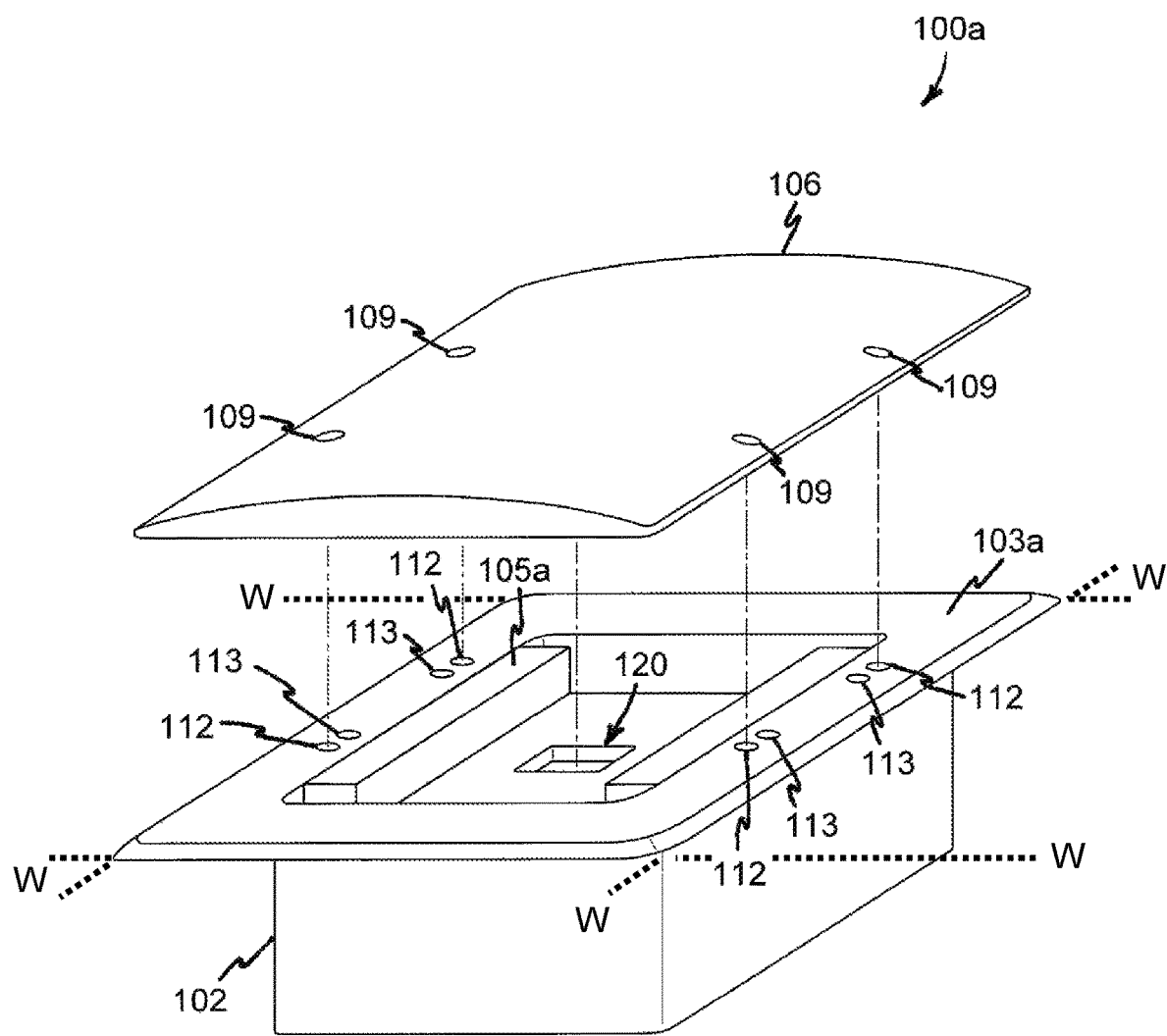
FIG. 4 is an exploded, perspective view of the anti-ligature enclosure for the wall-mounted apparatus of FIG. 1, shown partially assembled.
Figure 5:
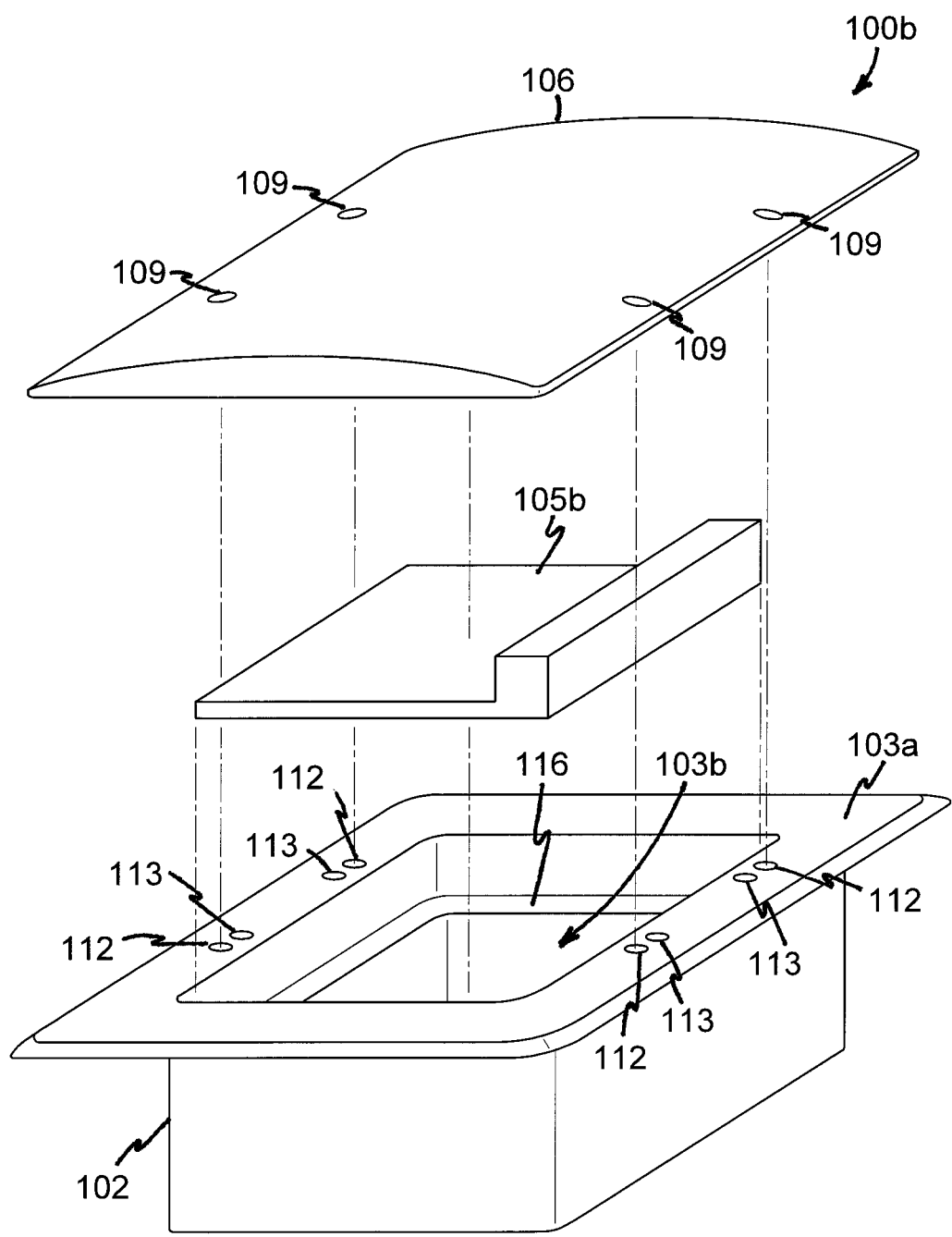
FIG. 5 is an exploded, perspective view of the anti-ligature enclosure for the wall-mounted apparatus of FIG. 1, according to a further non-limiting embodiment.

With reference to FIGS. 1, 2A, and 2B, and in non-limiting embodiments or aspects of the invention, FIG. 1 depicts an anti-ligature enclosure 100a for a wall-mounted apparatus 104, and FIGS. 2A and 2B depict a mounting plate 105a and mounting box 102 thereof, respectively. The enclosure 100a includes a recessed mounting box 102 having a planar frame 103a for contact on the outside face of a wall, and a recessed portion 103b (see FIG. 2) for extending through and behind the face of the wall. The recessed mounting box 102 is configured to contain a wall-mounted apparatus 104 (e.g., a wireless communication device, as shown) and connective wiring (not shown), if any, extending from the wall-mounted apparatus 104 and behind the wall. The enclosure 100a further includes, as shown in FIG. 2A, a mounting plate 105a for supporting the wall-mounted apparatus 104 in a fixed position in the enclosure 100a and to hide wiring, if any, extending behind the wall-mounted apparatus 104. There may be a number of alternative configurations for the mounting plate 105a to accommodate the size, shape, and orientation of the wall-mounted apparatus 104 within the enclosure 100a. Further, FIGS. 3 and 4 show a mounting plate 105a that centers the wall-mounted apparatus 104 along at least one axis in the enclosure 100a. Additionally, FIG. 5 shows an alternative enclosure 100b arrangement where an alternative mounting plate 105b aligns the wall-mounted apparatus 104 off-center and closer to an edge of the recessed mounting box 102. The mounting plate 105a may be configured to contact and be supported by one or more ledges 116 on the interior of the mounting box 102, such as a lip, bracket, rim, protrusion, and the like, so that the mounting plate 105a is supported near the front/top of the mounting box 102. The mounting plate 105a may be configured to cover an exact area of a cross-section of the recessed portion 103b of the mounting box 102 to prevent shifting of the mounting plate 105a and to obscure how the enclosure is assembled. It will be appreciated that many configurations are possible.

With continued reference to FIGS. 1, 2A, and 2B, and in further non-limiting embodiments or aspects, the enclosure 100a includes a cover plate 106 that covers and encloses the wall-mounted apparatus 104, the mounting plate 105a, and any other elements contained within the recessed mounting box 102. The cover plate 106 and the planar frame 103a are configured to allow the mounting box 102 to be flush-mounted in/on the wall, such that one cannot tie an object to the face of the apparatus. The cover plate 106 may be configured to be transparent, such that the contents contained in the mounting box 102 are visible through the cover plate 106. The cover plate 106 also may be configured to be resistant and/or impervious to damaging contact/forces/energy acting upon the cover plate 106. In environments where anti-ligature devices are often in demand, tamper-resistance and vandalism-resistance are important features, and the cover plate 106 and/or the frame 103a of the mounting box 102, which are exposed on the face of the wall, may be configured to exhibit those resistance features. The cover plate 106 may be manufactured from acetal, acrylic, glass/epoxy composite, polystyrene, laminated glass, polycarbonate, polyethylene terephthalate (PET), polybutylene terephthalate (PBT), polyethylene terephthalate glycol-modified (PETG), nylon, and the like. The mounting box 102 and the mounting plate 105a may be manufactured from the same or similar materials as the cover plate 106, such as when transparency is not required. The mounting plate 105a may include an aperture 120 to allow wiring, if any, to connect to the wall-mounted apparatus 104 from the recessed portion 103b of the mounting box 102. Such wiring may include a power supply connection, a data network connection, a grounding wire connection, and the like. The mounting box 102 may further include one or more openings 114 to allow the wiring to be connected from the interior of the recessed portion 103b to outside the enclosure 100a, behind the face of the wall. It will be appreciated that many configurations are possible.

With continued reference to FIGS. 1, 2A, and 2B, and in further non-limiting embodiments or aspects, the enclosure 100a includes cover plate fasteners 108 for affixing the cover plate 106 to the frame 103a of the mounting box 102. The cover plate fasteners 108 are configured to correspond and connect to corresponding receiving channels 112 (e.g., holes, nuts, threads, and the like) on the frame 103a of the mounting box 102. The cover plate fasteners 108 may be configured to be tamper-resistant and may include, but are not limited to, one-way screws, two-hole screws (pictured), hexalobular screws, socket-adapter screws, and the like. The cover plate fasteners 108 may be configured to be removable (often preferred for the ability to perform maintenance on the enclosure 100a) or unremovable. The cover plate fasteners 108 may be configured to extend beyond the cover plate 106, or the cover plate 106 may include countersunk channels for the cover plate fasteners 108, so that the outward side of the cover plate fasteners 108 are flush or recessed in the cover plate 106. The enclosure 100a may also include wall fasteners 110 (e.g., screws, bolts, anchors, etc.) for securing the frame 103a of the mounting box 102 to the face of the wall. The wall fasteners 110 may be covered by the cover plate 106 in the operational state, such that they are inaccessible when the cover plate 106 is fastened to the mounting box 102. It will be appreciated that many configurations are possible.

With continued reference to FIGS. 1, 2A, and 2B, and in further non-limiting embodiments or aspects of the invention, an anti-ligature enclosure 100a for a wall-mounted apparatus 104 is provided. In this first configuration of enclosure 100a, the mounting plate 105a is a U-shaped cradle having a middle recess between two protrusions formed to support and hold a wall-mounted apparatus 104 in the recess between the protrusions. This configuration centers the wall-mounted apparatus 104 along one axis of the mounting box 102. The mounting plate 105a has an aperture 120 for wiring, if any, to pass through the mounting plate 105a and connect to the backside of the wall-mounted apparatus 104. FIGS. 3 and 4 further illustrate exploded and partially exploded views showing the relationship of the various components of the enclosure 100a. It will be understood that the relative dimensions of the components may be modified to suit the installation site (wall and hole) and accommodate the dimensions of the wall-mounted apparatus 104. In one non-limiting example, the mounting plate 105a may be 4¾" wide, 4⅝" long, and 2 1/16" deep, and it may be used to support an RFID card reader in a mounting box 102. The mounting plate 105a may include additional channels (e.g., drill holes) to permit the mounting plate 105a to be mounted to the mounting box 102, such as through one or more faces of the mounting plate 105a. It will be appreciated that many configurations are possible.

Figure 6:
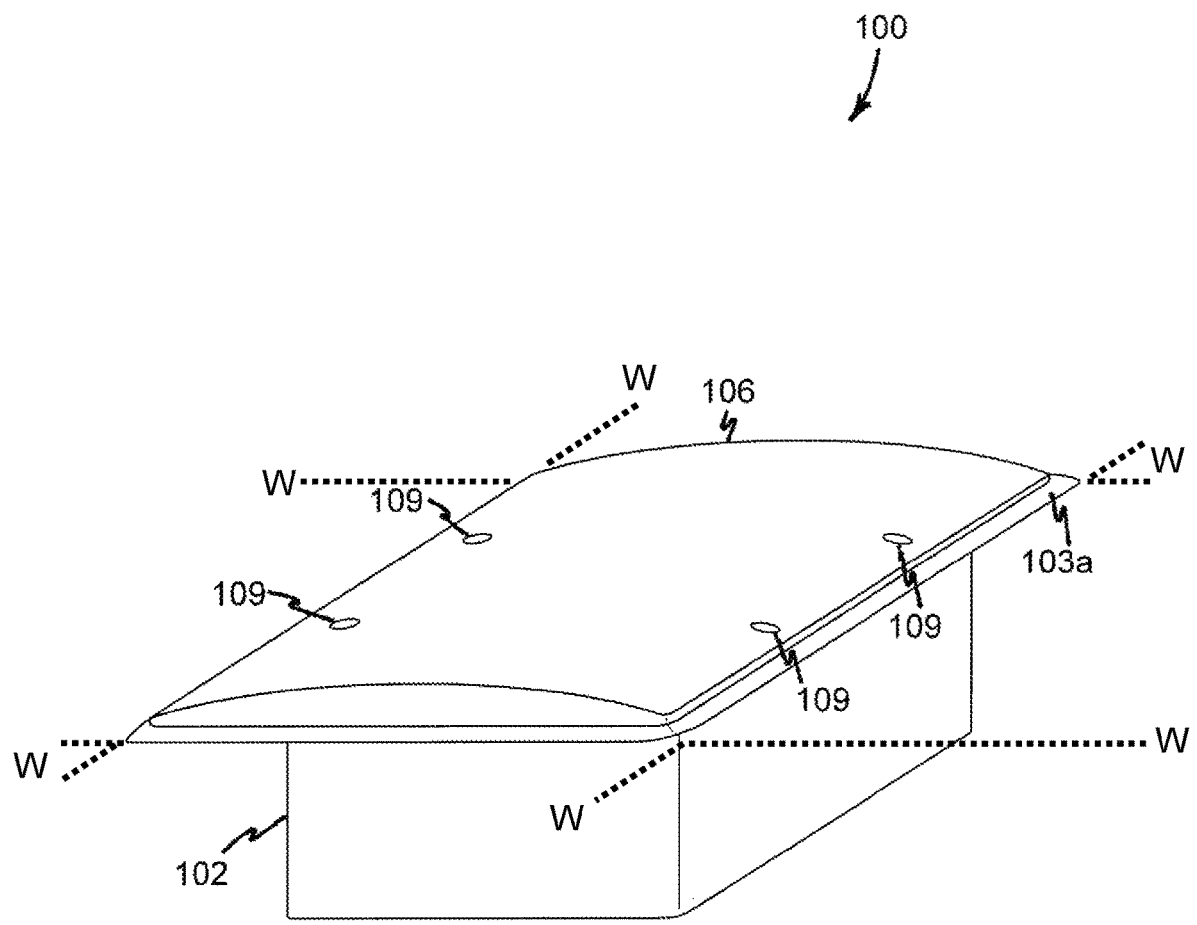
FIG. 6 is a perspective view of the anti-ligature enclosure for the wall-mounted apparatus of FIG. 1 and FIG. 5, shown fully assembled.

With specific reference to FIG. 3, in non-limiting embodiments or aspects of the invention, an anti-ligature enclosure 100a is shown for a wall-mounted apparatus (shown in FIG. 1). In this first configuration of the enclosure 100a, the mounting plate 105a is a U-shaped cradle having a middle recess between two protrusions formed to support and hold a wall-mounted apparatus in the recess between the protrusions. This configuration centers the wall-mounted apparatus along one axis of the mounting box 102. The apparatus of FIG. 3 is shown partially assembled in FIG. 4, wherein the mounting plate 105a is placed within the mounting box 102 against the ledges 116. FIG. 6 further illustrates a fully assembled anti-ligature enclosure of FIGS. 1-5.

With further reference to FIG. 3 and FIG. 4, and in further non-limiting embodiments or aspects, the mounting plate 105a has an aperture 120 for wiring, if any, to pass through the mounting plate 105a and connect to the backside of the wall-mounted apparatus 104. The mounting plate 105a is configured to interface with ledges 116 in the recessed portion 103b of the mounting box 102. The mounting plate 105a may be secured to the interior of the mounting box 102 with fasteners (e.g., adhesive, bolts, snaps, hook-and-loop, screws, latches, etc.). A cover plate 106 is provided to interface with the frame 103a of the mounting box 102 and cover the contents therein, thereby preventing tampering with a wall-mounted apparatus or tying any objects thereto. The cover plate 106 may be provided with cover plate fastener channels 109 for cover plate fasteners to secure the cover plate 106 to the frame 103a through corresponding receiving channels 112. The frame 103a may likewise contain frame fastener channels 113 for wall fasteners to fasten the mounting box 102 to the surface of the wall W (e.g., depicted in phantom in FIG. 4 as a plane indicated by dotted lines), wherein the frame 103a is flush against the surface of the wall and the remainder of the mounting box 102 is behind the plane of the wall surface. The frame fastener channels 113 may be covered by the cover plate 106 when the cover plate 106 is fastened to the frame 103a, thereby preventing tampering that would attempt to unfasten the frame 103a from the wall. It will be appreciated that there are many possible configurations for the form factor of the cover plate 106, including beveling, rounding, flattening, etc., to ensure the surface of the apparatus is anti-ligature.

With specific reference to FIG. 5, in non-limiting embodiments or aspects of the invention, an anti-ligature enclosure 100b for a wall-mounted apparatus according to another non-limiting embodiment is shown. FIG. 6 further illustrates a fully assembled state of the anti-ligature enclosure of FIGS. 1-5. Depicted in FIG. 5 is a second configuration of enclosure 100b where the mounting plate 105b is an L-shaped cradle having a side recess adjacent a protrusion formed to support and hold a wall-mounted apparatus in the recess adjacent the protrusion. This further configuration aligns the wall-mounted apparatus along one interior side of the mounting box 102. The mounting plate 105b may further have one or more apertures for wiring, when applicable to the wall-mounted apparatus, to pass through the mounting plate 105b and connect to the wall-mounted apparatus. The mounting plate 105b is configured to interface with ledges 116 in the recessed portion 103b of the mounting box 102. The mounting plate 105b may be secured to the interior of the mounting box 102 with fasteners (e.g., adhesive, bolts, snaps, hook-and-loop, screws, latches, etc.). A cover plate 106 is provided to interface with the frame 103a of the mounting box and cover the contents therein, thereby preventing tampering with a wall-mounted apparatus or tying any objects thereto. The cover plate 106 may be provided with cover plate fastener channels 109 for cover plate fasteners to secure the cover plate 106 to the frame 103a through corresponding receiving channels 112. The frame 103a may likewise contain frame fastener channels 113 for wall fasteners to fasten the mounting box 102 to the surface of the wall, wherein the frame 103a is flush against the surface of the wall and the remainder of the mounting box 102 is behind the plane of the wall surface. The frame fastener channels 113 may be covered by the cover plate 106 when the cover plate 106 is fastened to the frame 103a, thereby preventing tampering that would attempt to unfasten the frame 103a from the wall. It will be appreciated that there are many possible configurations for the form factor of the cover plate 106, including beveling, rounding, flattening, etc., to ensure the surface of the apparatus is anti-ligature.

It will be understood that the relative dimensions may be modified to suit the installation site (wall and hole) and accommodate the dimensions of the wall-mounted apparatus. In one non-limiting example, the mounting plate 105b may be 4¾" wide, 4⅝" long, and 2¹⁄₁₆" deep, and it may be used to support an RFID card reader in a mounting box 102. The mounting plate 105b may include additional channels (e.g., drill holes) to permit the mounting plate 105b to be mounted to the mounting box 102, such as through one or more faces of the mounting plate 105b. It will be appreciated that many configurations are possible.

With specific reference to FIG. 6, in non-limiting embodiments or aspects of the invention, the anti-ligature enclosure 100 for a wall-mounted apparatus is depicted as assembled. The depicted configuration may accommodate a U-shaped mounting plate, an L-shaped mounting plate, a flat-face mounting plate, or any like configuration of mounting plate inside the mounting box 102 and beneath the cover plate 106. The cover plate 106 is shown as flush against the frame 103a of the mounting box 102, so as to prevent any tying off or tampering. The cover plate fastener channels 109 may be used with cover plate fasteners to secure the cover plate 106 to the mounting box 102. The cover plate fasteners may be rounded so as to prevent tying off. The cover plate fastener channels 109 may also be countersunk so as to prevent a cover plate fastener from being exposed above the surface of the cover 106. The depicted assembly may be recessed into a wall, such that the frame 103a is in or on the surface of the wall W (e.g., depicted in phantom in FIG. 6 as a plane indicated by dotted lines) and the remainder of the mounting box 102 is hidden behind the wall.

Figure 7:
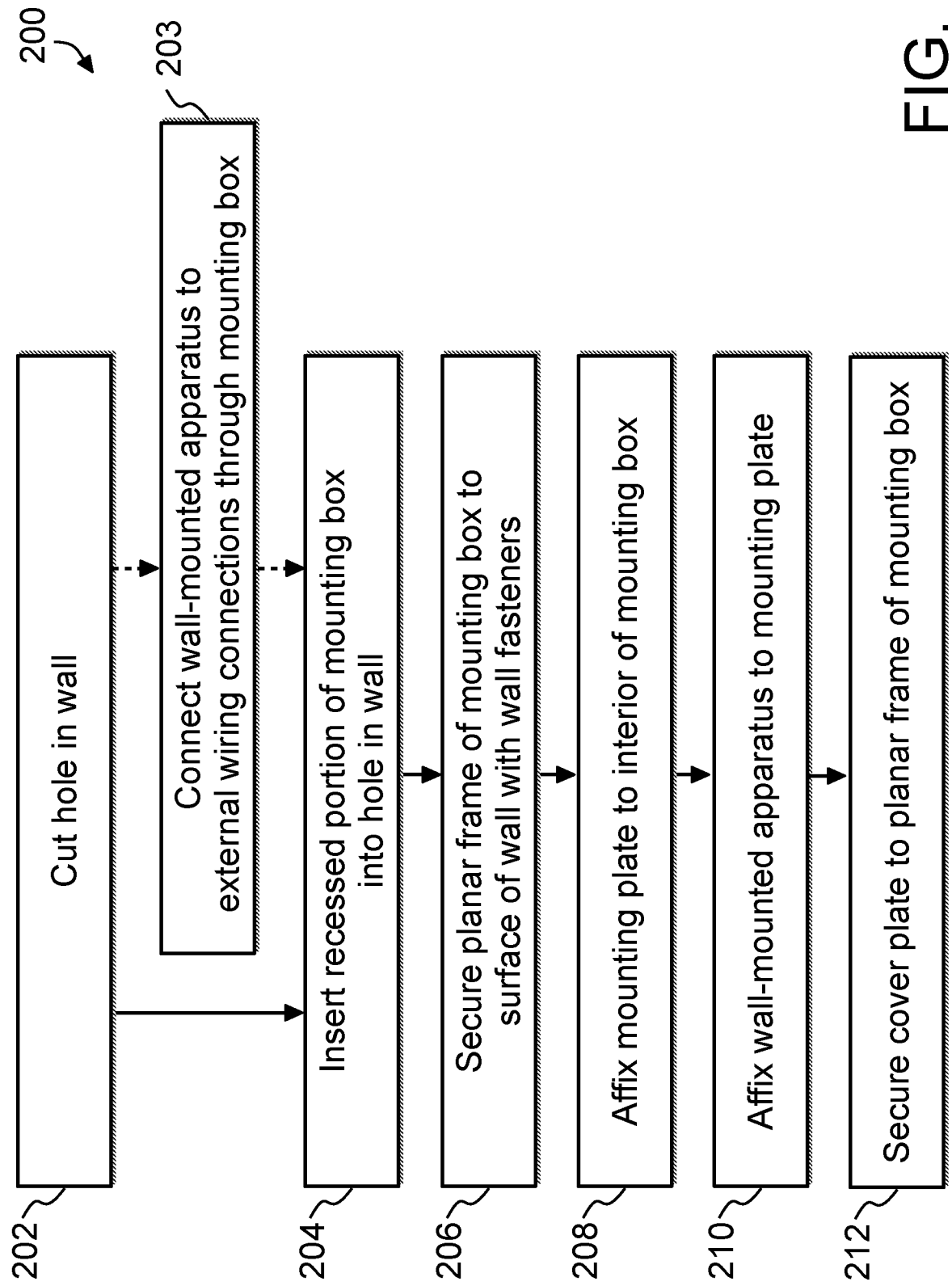
FIG. 7 is a flow diagram of a method of installing an anti-ligature enclosure for the wall-mounted apparatus of FIG. 1.

With specific reference to FIG. 7, and in non-limiting embodiments or aspects of the invention, a method 200 of installing an anti-ligature enclosure for a wall-mounted apparatus is depicted. The steps may be carried out by one or more installer personnel, and the order of the steps may vary from the exact flow shown in FIG. 7. In step 202, an installer may cut a hole in a wall to receive the recessed portion of the mounting box of the anti-ligature enclosure. A cross section of the hole in the wall may be greater than a cross-sectional area of the recessed portion of the mounting box, to allow the recessed portion to be placed through the hole. The cross section of the hole may be smaller than the cross-sectional area of the planar frame, to allow the planar frame to contact the wall around the hole and be fastened to the wall. In step 203, for a wall-mounted apparatus that is a wall-mounted electronic device requiring a connection to external wiring, the installer may connect the wall-mounted apparatus to external wiring connections behind the surface of the wall through the mounting box. Wiring may be connected from the wall-mounted apparatus, through an aperture in the mounting plate, into a recessed portion of the mounting box, and through an opening in the recessed portion to a space behind the wall.

In step 204, the installer may insert the recessed portion of the mounting box into the hole in the wall. In step 206, the installer may secure a planar frame of the mounting box to a surface of the wall with wall fasteners (e.g., screws, bolts, anchors, etc.). In step 208, the installer may affix a mounting plate to an interior of the mounting box. The mounting plate may be configured to contact and support the wall-mounted apparatus. The installer may affix the mounting plate to an interior of the mounting box by fastening the mounting plate to an inner ledge of the recessed portion of the mounting box. The mounting plate may be configured to cover an entire cross-sectional area of the recessed portion of the mounting box, such as to hide wiring or other connections. In step 210, the installer may affix the wall-mounted apparatus to the mounting plate with one or more fasteners.

In step 212, the installer may secure a cover plate to the planar frame of the mounting box with one or more cover plate fasteners. The cover plate may extend over the mounting plate and wall-mounted apparatus, such that it entirely covers an opening to the interior of the mounting box. The installer may fasten a plurality of two-hole screws through countersunk fastener channels in the cover plate and into fastener channels in the planar frame. A transition from a perimeter edge of the cover plate to the planar frame is configured to prevent an object from being tied to the edges of the planar frame. The outer surface of the enclosure, with the cover plate attached, may be flush-mounted to the surface of the wall. Step 206 may precede step 212 so that the cover plate, when secured, prevents access to underlying wall fasteners.

Although the invention has been described in detail for the purpose of illustration based on what is currently considered to be the most practical and preferred and non-limiting embodiments, it is to be understood that such detail is solely for that purpose and that the invention is not limited to the disclosed embodiments but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. An anti-ligature enclosure for a wall-mounted apparatus, comprising:
    a mounting box configured to be installed at least partially on a surface of a wall and at least partially within a space behind the surface of the wall, the mounting box comprising a planar frame configured to be fastened to the surface of the wall and a recessed portion extending through the surface of the wall;
    a mounting plate comprising a cradle formed to support and securely hold the wall-mounted apparatus in an outward-facing position in the mounting box; and
    a cover plate configured to be securely fastened to at least part of an outer surface of the planar frame of the mounting box with one or more cover plate fasteners, the cover plate extending over and covering the wall-mounted apparatus and the mounting plate,
    wherein an outer surface of the anti-ligature enclosure is flush-mounted to the surface of the wall, and
    wherein a transition from a perimeter edge of the cover plate to the planar frame is configured to prevent an object from being tied to edges of the planar frame.

2. The anti-ligature enclosure of claim 1, wherein:
the wall-mounted apparatus is a wall-mounted electronic device;
the recessed portion of the mounting box is configured to at least partially contain wiring in the space behind the surface of the wall and comprises at least one opening to permit the wiring to extend outside the recessed portion of the mounting box and to connect to external wiring connections behind the surface of the wall;
the mounting plate comprises an aperture configured to permit the wiring to extend from the wall-mounted electronic device into the recessed portion of the mounting box; and
the mounting plate is positioned to visually hide the wiring extending behind the wall-mounted electronic device and into the mounting box.

3. The anti-ligature enclosure of claim 1, wherein the cover plate, while fastened to the planar frame of the mounting box, covers wall fasteners for securing the planar frame to the surface of the wall, such that the wall fasteners cannot be accessed while the cover plate is secured.

4. The anti-ligature enclosure of claim 1, wherein the cover plate is configured to permit a wireless communication device as the wall-mounted apparatus to transmit and receive signals through the cover plate.

5. The anti-ligature enclosure of claim 1, wherein the cover plate is manufactured from a material resistant to damaging contact acting upon the cover plate.

6. The anti-ligature enclosure of claim 1, wherein the cover plate further comprises one or more countersunk fastener channels for the one or more cover plate fasteners, such that the one or more cover plate fasteners do not extend beyond an outer surface of the cover plate while the cover plate is secured to the planar frame.

7. The anti-ligature enclosure of claim 6, wherein the one or more cover plate fasteners comprise a plurality of two-hole screws.

8. The anti-ligature enclosure of claim 1, wherein the mounting plate comprises a U-shaped cradle having a middle recess between two protrusions, formed to support and securely hold the wall-mounted apparatus in a recess between the protrusions.

9. The anti-ligature enclosure of claim 8, wherein the mounting plate is fastened to an inner ledge of the recessed portion of the mounting box and is configured to cover an entire cross-sectional area of the recessed portion of the mounting box.

10. The anti-ligature enclosure of claim 1, wherein the cover plate is a transparent cover plate.

11. The anti-ligature enclosure of claim 1, wherein the cover plate fasteners are tamper-resistant fasteners.

12. The anti-ligature enclosure of claim 1, wherein the mounting plate comprises an L-shaped cradle having a side recess adjacent a protrusion formed to support and securely hold the wall-mounted apparatus in the recess adjacent the protrusion.

13. A method of installing an anti-ligature enclosure, comprising:
cutting a hole in a wall to receive a recessed portion of a mounting box of the anti-ligature enclosure;
inserting the recessed portion of the mounting box into the hole in the wall;
securing a planar frame of the mounting box to a surface of the wall with wall fasteners;
affixing a mounting plate to an interior of the mounting box, the mounting plate configured to contact and support a wall-mounted apparatus;
securing a cover plate to the planar frame of the mounting box with one or more cover plate fasteners, the cover plate extending over and covering the mounting plate such that an outer surface of the anti-ligature enclosure is flush-mounted to the surface of the wall.

14. The method of claim 13, wherein the wall-mounted apparatus is a wall-mounted electronic device, the method further comprising connecting the wall-mounted electronic device to external wiring connections behind the surface of the wall via wiring through an aperture in the mounting plate, through an interior of the recessed portion of the mounting box, and through an opening in the recessed portion.

15. The method of claim 13, wherein affixing the mounting plate to an interior of the mounting box comprises fastening the mounting plate to an inner ledge of the recessed portion of the mounting box, the mounting plate being configured to cover an entire cross-sectional area of the recessed portion of the mounting box.

16. The method of claim 13, wherein securing the planar frame of the mounting box to the surface of the wall precedes securing the cover plate to the planar frame of the mounting box, and wherein the cover plate covers the wall fasteners such that the wall fasteners cannot be accessed while the cover plate is secured.

17. The method of claim 13, wherein a cross section of the hole in the wall is greater than a cross-sectional area of the recessed portion of the mounting box and less than a cross-sectional area of the planar frame.

18. The method of claim 13, wherein securing the cover plate to the planar frame of the mounting box with one or more cover plate fasteners comprises fastening a plurality of two-hole screws through countersunk fastener channels in the cover plate and into fastener channels in the planar frame.

19. The method of claim 18, wherein a transition from a perimeter edge of the cover plate to the planar frame is configured to prevent an object from being tied to the edges of the planar frame.

20. An anti-ligature enclosure for a wall-mounted apparatus, comprising:
a mounting box configured to be installed at least partially on a surface of a wall and at least partially within a space behind the surface of the wall, the mounting box comprising a planar frame configured to be fastened to the surface of the wall and a recessed portion extending through the surface of the wall;
a mounting plate comprising a cradle formed to support and securely hold the wall-mounted apparatus in an outward-facing position in the mounting box; and
a cover plate configured to be securely fastened to at least part of an outer surface of the planar frame of the mounting box with one or more cover plate fasteners, the cover plate extending over and covering the wall-mounted apparatus and the mounting plate, wherein
an outer surface of the anti-ligature enclosure is flush-mounted to the surface of the wall,
the wall-mounted apparatus is a wall-mounted electronic device;
the recessed portion of the mounting box is configured to at least partially contain wiring in the space behind the surface of the wall and comprises at least one opening to permit the wiring to extend outside the recessed portion of the mounting box and to connect to external wiring connections behind the surface of the wall;

the mounting plate comprises an aperture configured to permit the wiring to extend from the wall-mounted electronic device into the recessed portion of the mounting box; and the mounting plate is positioned to visually hide the wiring extending behind the wall-mounted electronic device and into the mounting box.

\* \* \* \* \*